Sept. 23, 1969 C. B. NEAL 3,469,023

COLOR BALANCE AUTOMATIC SHIFT APPARATUS

Filed July 8, 1966 4 Sheets-Sheet 1

INVENTOR.
CHARLES B. NEAL
BY
Robert E. Strauss
ATTORNEY

COLOR BALANCE AUTOMATIC SHIFT APPARATUS

Filed July 8, 1966

INVENTOR.
CHARLES B. NEAL
BY
Robert E. Strauser
ATTORNEY

COLOR BALANCE AUTOMATIC SHIFT APPARATUS

INVENTOR.
CHARLES B. NEAL
BY
Robert E. Strauss
ATTORNEY

Sept. 23, 1969 C. B. NEAL 3,469,023

COLOR BALANCE AUTOMATIC SHIFT APPARATUS

Filed July 8, 1966 4 Sheets-Sheet 4

INVENTOR.
CHARLES B. NEAL

BY Robert E. Strauss

ATTORNEY

United States Patent Office 3,469,023

Patented Sept. 23, 1969

3,469,023

COLOR BALANCE AUTOMATIC SHIFT APPARATUS

Charles Bailey Neal, Batavia, N.Y., assignor to Sylvania Electric Products Inc., a corporation of Delaware Filed July 8, 1966, Ser. No. 563,865
Int. Cl. H04n 5/42, 5/44
U.S. Cl. 178—5.4 10 Claims

ABSTRACT OF THE DISCLOSURE

A compatible color television receiver adapted to reproduce images in both monochrome and color includes a light source and a light-dependent impedance for automatically shifting the "white" response color temperature of a visual image display device in accordance with a shift in received signals.

This invention relates to compatible color television receivers adapted to reproduce both monochrome and color display images in accordance with monochrome and color signals and more particularly to apparatus for automatically shifting the "white" response color temperature of a visual display device in accordance with a shift in received signals.

In accordance with present standards of signal transmission, color television signals have a composition which is based upon a "white" response color temperature for a "standard" color television receiver in the range of about 6500 to 7000° K. However, most "standard" monochrome television receivers provide a "white" response color temperature in the range of about 11,000 to 12,000° K. Thus, the designer of a compatible color television receiver capable of providing a visual image display in response to both monochrome and color signals is faced with the problem of providing a desired "white" response at two widely different color temperatures with a singular visual image display device.

The most common approach to the problem in present-day compatible color television receivers is to compromise the "white" response color temperature at some intermediate value, about 9300° K. for instance, for both monochrome and color signals. Obviously, such a compromise approach leaves much to be desired because of the resultant degradation in "white" response for both types of signals.

In another known approach to the "white" response color temperature problem, a manual switch is inserted in the receiver circuitry whereby the viewer may select the "white" response color temperature of the visual display device in accordance with the type of signal being received. However, frequent shifting of the transmitted signal between monochrome and color renders it highly desirable to provide a system which automatically shifts the "white" response color temperature in accordance with the type of signal transmitted. Thus, the viewer is not required to adjust the receiver each time the transmitted signal is altered. In still another approach to the "white" response color temperature problem, multi-contact relays and adjustable resistors are utilized which either automatically or manually permit a shift in "white" response color temperature of the visual image display device. However, it has been found that this function is controllable in a much more inexpensive and reliable manner by utilizing elements wherein moving parts and changing electrical contacts are eliminated.

Therefore, it is an object of this invention to enhance the visual image reproduction capabilities of a compatible color television receiver.

Another object of the invention is to improve the utility of a compatible color television receiver by automatically shifting the "white" response color temperature of a visual image display in accordance with the type of signal received.

A further object of the invention is to enhance the visual image reproduction capabilities of a compatible color television receiver by providing stationary means for automatically shifting the "white" response color temperature of a visual image display device in accordance with a shift in received signals.

These and other objects are achieved in one aspect of the invention by a compatible color television receiver adapted to reproduce images in both monochrome and color wherein a light source and a light dependent impedance means are utilized to automatically shift the "white" response color temperature of a visual image display device in accordance with a shift in received signals.

For a better understanding of the present invention, together with other and further objects, advantages and capabilities thereof reference is made to the following disclosure and appended claims in connection with the accompanying drawings in which:

Figures 1, 3:
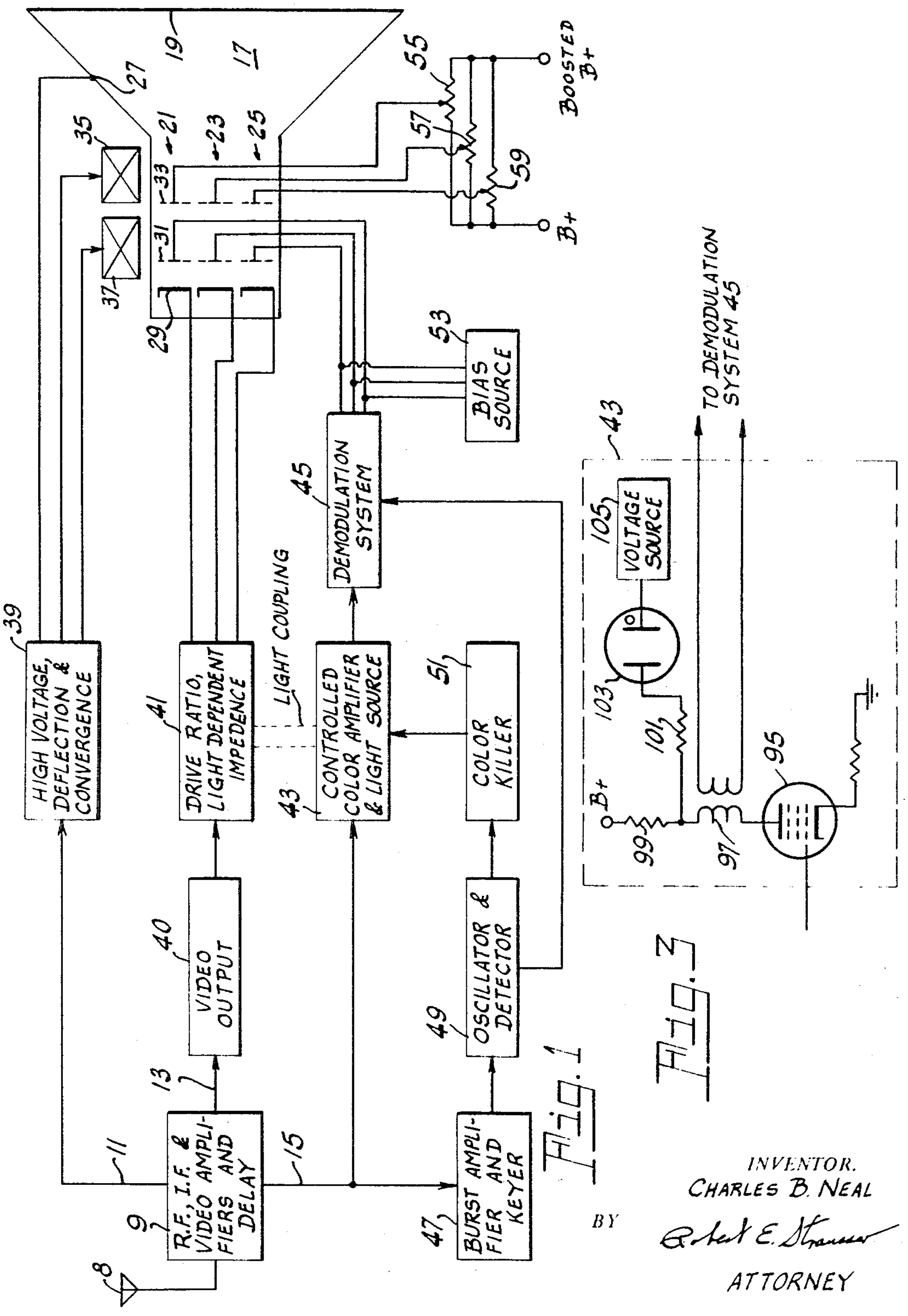
FIG. 1 illustrates, in block form, a compatible television receiver utilizing one embodiment of the invention.
FIG. 3 illustrates another embodiment of the invention of FIG. 2.

Referring to the drawings, FIG. 1 illustrates a compatible color television receiver adapted to respond to both monochrome and color signals to reproduce visual images in both black and white and color. Also, the receiver illustrates a preferred embodiment of the invention as will be explained hereinafter.

The receiver includes an antenna 8 for intercepting transmitted signals and coupling these signals to a receiver circuit, block 9, including the usual RF, IF, and video amplification and detection stages. The receiver circuit, block 9, provides a number of output signals which are applied by way of a high voltage channel 11, a luminance channel 13, and a chrominance channel 15 to a color cathode ray tube 17.

The color cathode ray tube 17 may be any one of a number of well known image reproducers and a preferred form is a "shadow-mask" type of reproducer. The cathode ray tube 17 has a screen 19 whereon is disposed triads of phosphors light responsive to electron impingement of the electron beams available from so-called red, green, and blue electron guns, 21, 23, and 25 respectively, to provide red, green, and blue colors. Also, the cathode ray tube 17 includes an anode 27 and each of the electron guns 21, 23, and 25 includes a cathode 29, control grid 31, and screen grid 33.

Referring back to the output signals available from the receiver circuitry, block 9, a signal output is applied to the high voltage channel 11 which includes the high voltage, beam deflection, and beam convergence circuitry 39. Therein is developed a high voltage which is applied to the anode 27 of the cathode ray tube 17, horizontal and vertical deflection signals which are applied to the deflection apparatus 35 associated with the cathode ray tube 17 and serve to cause the electron beams to scan the screen 19, and convergence signals which are applied to the convergence apparatus 37 and serve to converge the electron beam provided by the electron guns 21, 23, and 25 respectively.

Another output from the receiver circuit, block 9, is applied to the luminance channel 13 which includes the usual video signal output means 40 having brightness and contrast controls and a signal drive voltage ratio means 41. In the embodiment, the signal drive voltage ratio means 41 includes one or more light dependent impedances which will be explained hereinafter. The luminance channel 13 processes information corresponding to the black and white levels of an image being scanned and provides the desired levels of brightness and contrast. Thereafter, the signal drive voltage ratio means 41 treats this information in a manner such that a desired voltage ratio is applied to the cathode 29 of the electron guns 21, 23, and 25. These signals, in conjunction with others, and the cathode ray tube 17 cause reproduction of an image on the screen 19 having a "white" response color temperature as will be explained hereinafter.

Still another output from the receiver circuitry, block 9, is applied to the chrominance channel 15 wherein a controlled color amplifier stage 43 passes the chrominance components of a composite video signal to a demodulation system 45. The controlled color amplifier stage 43 also includes a light source which is light coupled to the previously-mentioned light dependent impedance of the signal drive ratio means 41 as will be explained hereinafter.

The composite video signal, including a color burst signal, available from the receiver circuitry, block 9, is also applied to a burst amplifier and keyer stage 47 and oscillator and detector stages 49 shunting the controlled color amplifier 43. One output from the oscillator and detector stages 49 is coupled to a color killer stage 51 wherein is developed a control signal which is applied to the controlled color amplifier stage 43 and serves to enable and disable the bandpass amplifier stage 43 in accordance with color and monochrome signals. Another output from the oscillator and detector stages 49 is coupled to the demodulation system 45 wherein a synchronous demodulation process provides R-Y, B-Y, and G-Y color difference signals which are individually applied to the control grid 31 of each of the electron guns 21, 23, and 25.

Additionally, a bias voltage source 53 provides the necessary bias potentials for the electrodes of the electron guns, 21, 23, and 25 of the color cathode ray tube 17. Obviously, any one of a number of well-known techniques may be utilized to provide the above-mentioned bias potentials. Further, separate alterable impedances 55, 57, and 59 respectively, paralleled coupled intermediate a first voltage source, Boosted B+ and a second voltage source B+ provide individually alterable bias potentials which are applied to the screen grid 33 of each of the electron guns 21, 23, and 25.

Figures 2, 4:
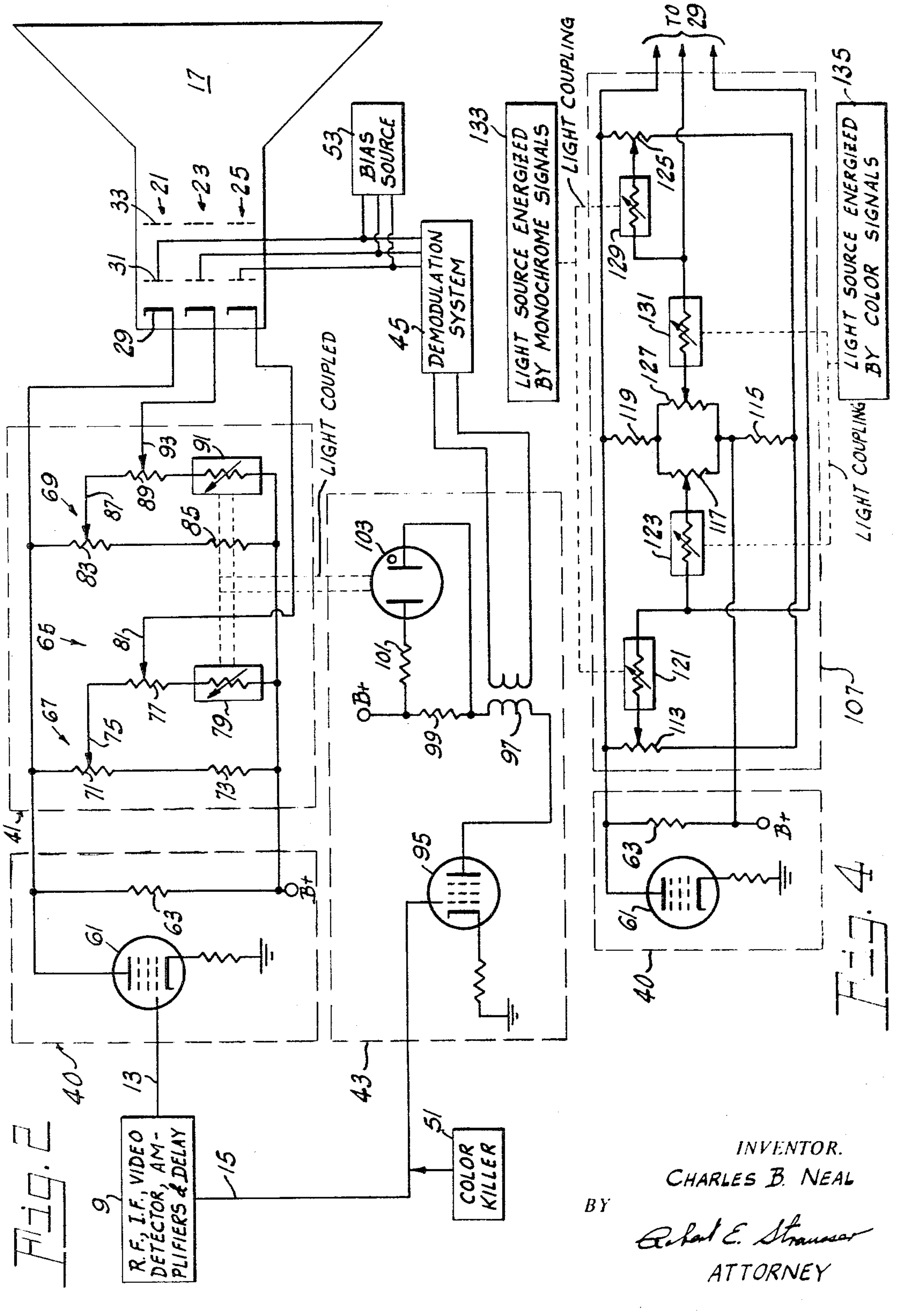
FIG. 2 illustrates, in block and schematic form, pertinent features of the receiver of FIG. 1.
FIG. 4 illustrates, in block and schematic form, another embodiment of the invention.

Referring to FIG. 2 wherein the embodiment of FIG. 1 is more specifically illustrated, the luminance channel 13 provides a luminance signal which is applied to the color cathode ray tube 17 via the series connected video output stages 40 and signal drive ratio means 41. The chrominance channel 15 also provides a signal which is applied to the color cathode ray tube 17 by way of the controlled color amplifier stage 43 and demodulation system 45. Further, a control signal developed in the color killer stage 51 in response to the presence and absence of a color burst signal applied thereto is applied to the controlled color amplifier stage 43 to provide enablement and disablement thereof.

More specifically, the video output stage 40 includes an electron discharge device 61 having the usual cathode, grids, and anode. The cathode is coupled via a resistor 62 to circuit ground and signal available from the luminance channel 13 is applied to the one grid, the control grid, thereof. An output signal available at the anode of the discharge device 61 is connected via the signal drive ratio means 41 to the cathode 29 of the red electron gun 21 of the color cathode ray tube 17. Also, the anode of the discharge device 61 is coupled by way of a load resistor 63 to a voltage source B+.

The voltage drive ratio means 41 includes a parallel circuit 65 having first and second voltage dividers 67 and 69 coupled intermediate the output signal available from the video output stage 40 and a voltage source B+. The first voltage divider 67 includes a series connected alterable resistor 71 and fixed resistor 73 with the adjustable tap 75 of the alterable resistor 71 coupled via a second alterable resistor 77 and light dependent impedance to the voltage source B+. The second alterable resistor 77 has an adjustable tap 81 coupled to the cathode 29 of the blue electron gun 25 of the color cathode ray tube 17. Similarly, the second voltage divider 69 includes a series connected alterable resistor 83 and fixed resistor 85 with the adjustable tap 87 of the alterable resistor 83 coupled via a second alterable resistor 89 and light dependent impedance 91 to the voltage source B+. The second alterable resistor 89 has an adjustable tap 93 coupled to the cathode 29 of the green electron gun 23 of the color cathode ray tube 17.

The controlled color amplifier stage 43 includes an electron discharge device 95 having the usual cathode, grids, and anode. A chrominance signal available from the chrominance channel 15 and a control signal available from the color killer stage 51 are applied to the grid of the electron discharge device 95. Also, the anode of the discharge device 95 is coupled via an inductor 97 and load resistor 99 to a voltage source B+. This load resistor 99 is shunted by a series connected resistor 101 and light source 103 with the light source 103 light coupled to the light dependent impedances 79 and 91 of the voltage ratio means 41. Further, an output signal available at the inductor 97 is coupled to the control grids 31 of the electron guns 21, 23, and 25 respectively via an inductive winding 105 and the demodulation system 45.

Assuming a composite signal resulting from a transmitted monochrome signal, there is no color burst signal available. Thus, the color killer stage 51 tends to develop a control signal which disables the controlled color amplifier 43 preventing passage therethrough of the received signal and development of a demodulated signal by the demodulation system 45. The disablement of the controlled color amplifier stage 43, by reducing the current flow therethrough, causes a reduction in the voltage drop across the load resistor 99 whereupon energization of the light source 103 is prevented. As a result, the light dependent impedances 79 and 91 remain at a first operational or highly resistant condition and a pre-determined ratio of the luminance signal applied to the signal ratio means 41 is, in turn, applied to the cathodes 29 of the electron guns 21, 23, and 25 of the color cathode ray tube 17. Therein, a "while" response having a particular color temperature, preferably about 11,000 to 12,000° K., is developed.

On the other hand, a transmitted color signal which includes a color burst signal causes development of a control signal by the color killer stage 51 which enables the controlled color amplifier stage 43. Upon enablement, the controlled color amplifier stage 43 serves to pass an applied composite signal to the demodulation system 45 wherein the usual color difference signals are developed which are applied to the control grids 31 of the electron guns 21, 23, and 25 of the color cathode ray tube 17.

Enablement of the controlled color amplifier stage 43, by increasing current flow therethrough, causes an increase in the voltage drop across the load resistor 99 whereupon the light source 103 is shifted from an unenergized to an energized condition. Since the light source 103 is light-coupled to the light-dependent impedances. 79 and 91, the impedances 79 and 91 are automatically shifted from a first highly resistant operational condition to a second highly conductive operational condition. As a result, the previously mentioned pre-determined ratio of luminance signals applied to the cathodes 29 of the electron guns 21, 23, and 25 is automatically shifted to a different signal ratio which is automatically applied to the above-mentioned cathodes 29. Thus, a shift in transmitted signals causes an automatic shift in the ratio of signals applied to the cathodes 29 of the color cathode ray tube 17 whereupon there is provided a visual image display having a "white" response at a different color temperature i.e. preferably in the range of about 6500 to 7000° K. for color signals.

Also, FIG. 3 illustrates an alternative light control arrangement wherein the series connected resistor 101 and light source 103 are coupled intermediate the junction of the inductor 97 and load resistor 99 and a second voltage source 105. This alternative light control arrangement provides for energization of the light source 103 during monochrome signal transmission and de-energization thereof during transmission of a color signal. Thus, by suitable re-arrangement of the voltage drive ratio means 41 of FIG. 2 to an arrangement illustrated in FIG. 4, to be explained hereinafter, the "white" response color temperature is shifted in accordance with an operational condition of the light source 103 opposite to the operational condition thereof as explained with respect to FIG. 2.

FIG. 4 illustrates another embodiment of the invention wherein the video output stage 40 is coupled to a voltage drive ratio means 107. This voltage drive means 107 includes a first voltage divider 109 and a second voltage divider 111 coupled intermediate the output signal available from the video output stage 40 and a voltage source B+. The first voltage divider 109 includes a first alterable resistor 113 and a first fixed resistor 115 in parallel with a second alterable resistor 117 and a second fixed resistor 119 coupled intermediate the video-output stage 40 and a voltage source B+. Each of the alterable resistors 113 and 117 respectively, has an adjustable arm coupled to a common junction via a light dependent impedance 121 and 123 respectively, connected to a cathode 29 of the color cathode ray tube 17.

Similarly, the second voltage divider 111 includes a first alterable resistor 125 and the first fixed resistor 115 in parallel with a second alterable resistor 127 and the above-mentioned second fixed resistor 119 coupled intermediate the video output stage 40 and the voltage source B+. Again, each of the alterable resistors, 125 and 127 respectively, has an adjustable arm coupled via light dependent impedance, 129 and 131 respectively, to a common junction connected to a cathode 29 of the color cathode ray tube 17. Also, the video output stage 40 is directly connected to a cathode 29 of the color cathode ray tube 17. Further, the light dependent impedances 121 and 129 are both light-coupled to light source 133 energized during transmitted monochrome signals while the light dependent impedances 123 and 131 are both light-coupled to a light source 135 energized during transmitted color signals.

It can be readily understood that a transmitted monochrome signal will cause a reduction in value of the light dependent impedances 121 and 129 and an increase in value of the light dependent impedances 123 and 131. Thus, the adjustable arms of the alterable resistors 113 and 125 may be positioned to provide for the application of a suitable ratio of drive voltages to the cathodes 29 of the color cathode ray tube 17 to cause development of one "white" response color temperature. Conversely, a transmitted color signal will cause an increase in value of the light dependent impedances 121 and 129 and a decrease in value of the light dependent impedances 123 and 131. Thus, the adjustable arms of the alterable resistors 117 and 127 may be positioned to provide for the application of a different ratio of drive voltages to the cathodes 29 of the color cathode ray tube 17 to cause development of a different "white" response color temperature.

Figure 5:
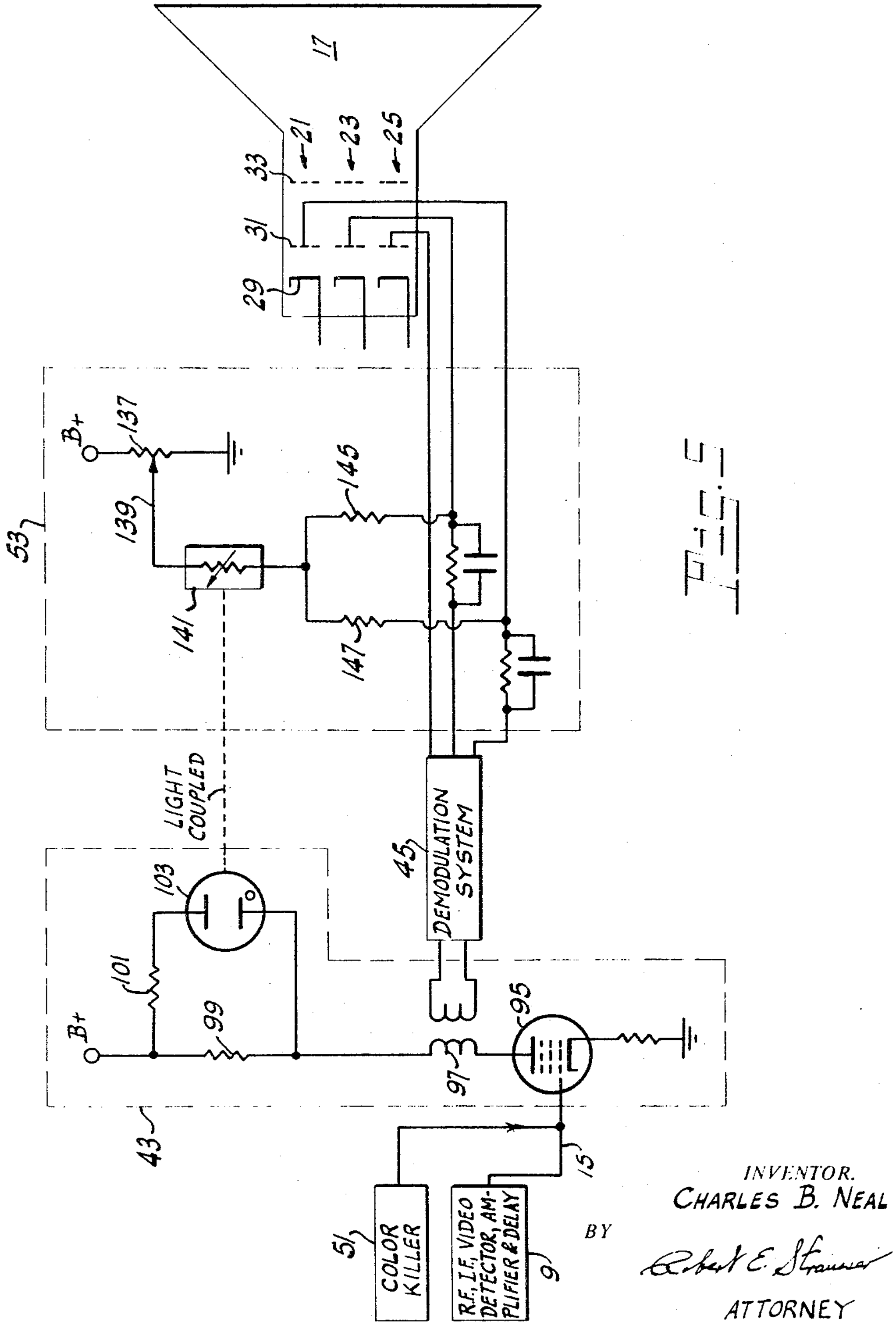
FIG. 5 illustrates still another embodiment of the invention.

FIG. 5 illustrates still another embodiment of the invention suitable for utilization with the compatible color television receiver illustrated in FIG. 1. Herein, a transmitted signal processed the receiver circuit, block 9, is coupled via the chrominance channel 15 to the controlled color amplifier stage 43 which is operated in accordance with a control signal provided by the color killer stage 51 coupled in circuit therewith and previously described. Also, the color controlled amplifier stage 43 includes an inductor 97 and load resistor 99 coupling the output electrode of the electron device 95 to a voltage source B+ and a series connected resistor 101 and light source 103 shunting the load resistor 99 as described with respect to FIG. 2. The output signals available from the color controlled amplifier stage 43 are coupled to the control grids 31 of the color cathode ray tube 17 via the demodulation network 45.

However, in this embodiment the bias source 53 includes an alterable resistor 137 coupled intermediate a voltage source B and a voltage reference level such as circuit ground. The alterable resistor 137 has an adjustable arm 139 which is coupled by way of a light dependent impedance 141 to the junction 143 of parallel coupled resistors 145 and 147 connected in circuit with the control grids 31 of the green and blue electron guns, 23 and 25 respectively of the color cathode ray tube 17. Further, the light dependent impedance 141 is disposed in light-responsive relationship to the light source 103.

In operation, a signal processed by the receiver means, block 9, causes development of a control signal by the color killer stage 51 which determines the operational condition of the color control amplifier stage 43 and the light source 103. In turn, the operational condition of the light source 103 determines the operational condition of the light dependent impedance 141 which controls the ratio of bias potentials applied to the control grids 31 of the color cathode ray tube 17. Thus, shift in signals processed by the receiver means, block 9, causes an automatic shift in control signals provided by the color killer stage 51, an automatic shift in operational condition of the color controlled amplifier stage 43 including the light source 103, an automatic shift in value of the light dependent impedance 141, an automatic shift in the ratio of bias potentials applied to the control grids 31 of the color cathode ray tube 17, and an automatic shift in the "white" response color temperature developed therein.

Referring back to the preferred embodiments illustrated in FIGS. 1, 2, 3, and 4, it is to be noted that there is provided an automatic shift in "white" response color temperature in accordance with a shift in transmitted signals while maintaining uniformity of gray-scale tracking regardless of variations in the signal applied to the voltage drive ratio means 41 of FIGURE 1. In other words, shifting of the setting of the brightness and contrast controls does not cause a material change in the uniformity of gray-scale tracking. Moreover, the above-mentioned shift in "white" response color temperature in accordance with a shift in transmitted signals is accomplished automatically, reliably, and inexpensively utilizing light-coupling and stationary components.

More explicity, it is well known that each electron gun of a multi-gun color cathode ray tube has an individual characteristic drive curve and an individual cut-off value. Also, the slope of the characteristic drive curve is dependent upon the individual adjustments of the bias potentials applied to the screen grid electrode of each electron gun. Further, the cut-off value of the characteristic curve of each electron gun is dependent upon the individual bias potential applied to the control grid electrode thereof.

Figure 7:
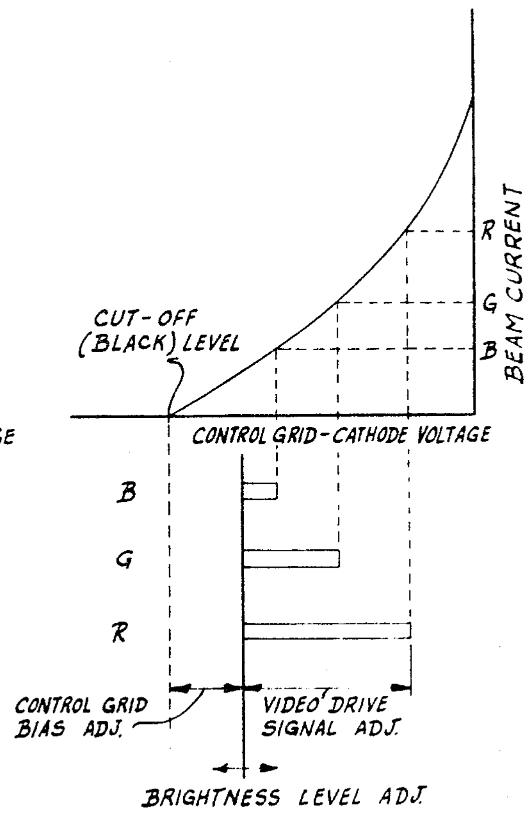

As graphically illustrated in FIG. 7, it is a common practice to set-up a "white" response color temperature by adjusting the value of bias potential applied to the control grid of each of the electron guns so that all cut off together and by adjusting the video drive levels to the appropriate percentages which will give the desired white color temperature. However, it can be readily understood that a system which alters the values of the bias potentials applied to the control grids of individual electron guns will obviously alter the gray-scale tracking. Also, a shift in the brightness level adjustment will cause a shift in the ratio of beam current available from each electron gun and an undesired shift in "white" response color temperature deleterious to uniform gray-scale tracking.

Figure 6:
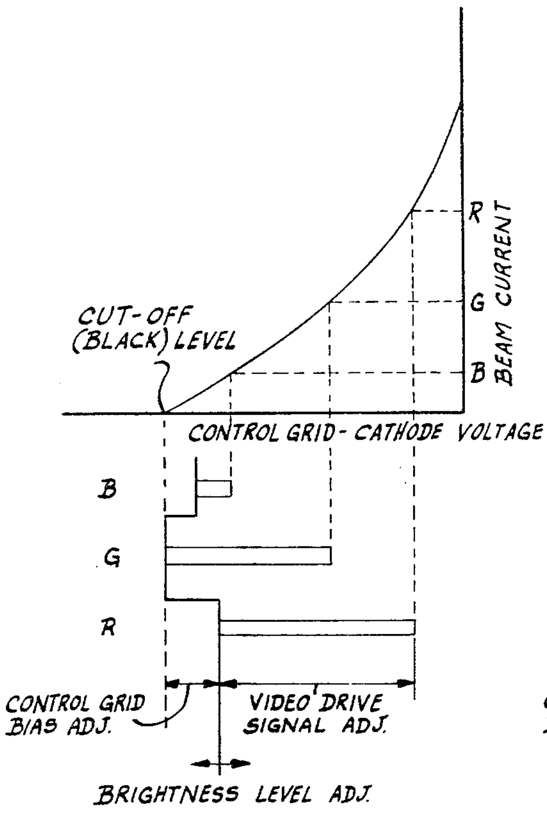
FIGS. 6 and 7 are graphic representations illustrating features of characteristic drive curves of color cathode ray tube electron guns.

For example, assuming one were to vary the brightness level of FIG. 6, it can be seen that as the level is moved in the direction of the electron beam cut-off value the electron beam available from the green electron gun would be the first to reach the cut-off value. Thereafter, the blue and red electron guns would reach the cut-off value. Thus, adjustment of the brightness level deleteriously affects the gray-scale tracking.

To overcome this undesirable condition, all of the electron guns are set-up to cut-off at substantially the same point on the characteristic drive curve as illustrated in FIG. 7. Therein, a substantially identical value of bias potential is applied to the control grid of each electron gun while the drive signals are adjusted to provide the desired ratio of potentials applied to the electron guns. Further, the bias potential applied to the screen grid electrode of each electron gun is adjusted to provide a substantially identical characteristic drive curve for each electron gun.

Under these conditions, it can be readily understood that uniform gray-scale tracking is achieved regardless of variations in the adjustment of the brightness level. Moreover, it is obvious that a system which alters the bias potentials applied to either the control grid electrode or screen grid electrode of one electron gun with respect to another will cause a deviation in the characteristic drive curve thereof and non-uniform gray-scale tracking.

Therefore, by providing means, in the form of light dependent impedances light-coupled to a light source, for altering the ratio of signal drive voltages applied to the cathodes 29 of the electron guns 21, 23, and 25 while maintaining substantially unchanged bias potentials on the control and screen grids thereof to provide substantially identical characteristic drive curves for all of the electron guns 21, 23, and 25, it can be readily seen that the "white" response can be shifted from one color temperature to another. Moreover, this shift in "white" response color temperature is accomplished automatically with a shift in transmitted signals and without loss of uniformity of gray-scale tracking regardless of variations in brightness and contrast levels.

Thus, there has been provided a compatible television receiver having enhanced capabilities for image reproduction of both monochrome and color television signals. The receiver includes stationary apparatus for automatically shifting the "white" response color temperature in accordance with a shift in transmitted signals. Also, apparatus is provided for effecting this shift in "white" response color temperature for all settings of brightness and contrast controls without deleterious effect upon the gray-scale tracking capabilities of the receiver. Further, alternative apparatus is provided for automatically effecting this shift in "white" response color temperature at relatively low cost and circuit complexity and at relatively high reliability.

While there has been shown and described what is at present considered the preferred embodiments of the invention, it will be obvious to those skilled in the art that various changes and modifications may be made therein without departing from the invention as defined by the appended claims.

What is claimed is:

1. In a color television receiver for processing both monochrome and color signals to provide a visual image display, apparatus for automatically shifting the "white" response color temperature of the visual display in accordance with a shift in received signals comprising in combination:

receiver means for processing both monochrome and color signals and including at least one light source having two operational conditions and means for automatically shifting from one to the other of said light source operational conditions in response to a shift in signals processed by said receiver means;

visual image display means coupled to said receiver means and including a color cathode ray tube having a fluorescent screen with phosphors thereon light responsive to electron beam impingement and at least two electron guns each having a cathode, control grid, and screen grid and providing an electron beam; and signal drive ratio means coupling a signal from said receiver means to said visual image display means, said signal drive ratio means including at least one light dependent impedance means light-coupled to said light source, said light dependent impedance means automatically shifting in impedance value in response to an automatic shift in said light source operational conditions and causing an automatic shift in the signals applied to said visual image display means whereby a shift in applied signals alters the "white" response color temperature of said visual image display means.

2. The apparatus of claim 1 wherein said light dependent impedance means includes a photoconductive cell.

3. In a color television receiver for processing both monochrome and color signals to provide a visual image display, apparatus for automatically shifting the "white" response color temperature of the visual display in accordance with a shift in received signals comprising in combination:

visual image display means including a color cathode ray tube having a fluorescent screen with phosphors thereon light responsive to electron beam impingement and at least two electron guns each having a cathode, control grid, and screen grid and providing an electron beam; and receiver means coupled to the display means for processing both monochrome and color signals and including luminance and chrominance channels, said luminance channel including a signal drive ratio means coupling a luminescence signal to said visual image display means and said signal drive ratio means having at least one light-dependent impedance means for determining the ratio of luminance signal applied to said display device and said chrominance channel including controlled color amplifier circuitry having a light source light-coupled to said light-dependent impedance, said light source having two operational conditions with said chrominance channel including a color killer stage providing a control signal for determining the operational condition of said light source in accordance with the signal processed by said receiver means.

4. The apparatus of claim 1 wherein said light source is energized when a color signal is processed by said receiver means.

5. The apparatus of claim 1 wherein said light source is energized when a monochrome signal is processed by said receiver means.

6. The apparatus of claim 1 wherein said signal drive ratio means includes a first and second voltage divider parallel coupled intermediate a voltage source and a signal source with each of said voltage dividers including a coupling to the cathode of one electron gun and a light dependent impedance light-coupled and responsive to the operational condition of said light source.

7. The apparatus of claim 1 wherein said signal drive ratio means includes a first and second voltage divider coupled in parallel between a voltage source and a signal source with each of said voltage dividers including a first light dependent impedance responsive to a monochrome signal processed by said receiver means and a second light dependent impedance responsive to a color signal processed by said receiver whereby the ratio of signals applied to a visual image display is automatically shifted in accordance with a shift in signals processed by said receiver means.

8. In a color television receiver for processing both monochrome and color signals to provide a visual image display, apparatus for automatically shifting the "white" response color temperature of the display in accordance with a shift in received signals comprising in combination:

visual image display means including a color cathode ray tube having at least two electron guns and a fluorescent screen, each of said electron guns providing an electron beam and including a cathode, control grid, and screen grid and said fluorescent screen including phosphors thereon light responsive to impingement by said electron beams to provide an image display having a "white" response color temperature;

light dependent impedance means coupled in circuit with said visual image display means for determining the bias potential applied to said display means; and receiver means for processing both monochrome and color signals and applying said processed signals to said visual image display means, said receiver means including a chrominance channel having disablement and enablement means in response to monochrome and color signals respectively and a light source in light sensing relationship to said light dependent impedance means and operatively responsive to said enablement and disablement means to cause a shift in value of said impedance means whereby a shift in received signals causes an automatic shift in bias potential applied to said image display means and an automatic shift in "white" response color temperature of said visual image display means.

9. The apparatus of claim 5 wherein said light dependent impedance means is coupled intermediate the control grid and a reference voltage level of at least one electron gun of said visual image display means to cause the application to said control grid of a bias potential having a value which shifts in accordance with a shift in operational conditions of said light source, said operational condition of said light source being dependent upon the received signal.

10. The apparatus of claim 5 wherein said chrominance channel includes a controlled color amplifier stage and a color killer stage, said color killer stage causing disablement and enablement of said amplifier stage in accordance with received monochrome and color signals and said amplifier stage including a light source in circuit therewith and in light-responsive relation to said light dependent impedance means, said light source having an automatic shift in operational condition in accordance with disablement and enablement of said amplifier stage and said automatic shift in operational condition of said light source causing an automatic shift in value of said light dependent impedance means and an automatic shift in bias potential applied to the control grid of said electron gun resulting in an automatic shift in "white" response color temperature of said visual image display device.

References Cited

UNITED STATES PATENTS

| | | | |
|---|---|---|---|
| 2,954,426 | 9/1960 | Kroger | 178—5.4 |
| 3,135,824 | 6/1964 | Boothroyd | 178—5.4 |
| 3,268,815 | 8/1966 | Banach | 325—122 |
| 3,324,236 | 6/1967 | Dietch et al. | 178—5.4 |
| 3,388,217 | 6/1968 | Aiken | 179—1 |

RICHARD MURRAY, Primary Examiner